(12) United States Patent
Tanaka

(10) Patent No.: US 7,218,354 B2
(45) Date of Patent: May 15, 2007

(54) IMAGE PROCESSING DEVICE AND METHOD, VIDEO DISPLAY DEVICE, AND RECORDED INFORMATION REPRODUCTION DEVICE

(75) Inventor: Tetsuro Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 525 days.

(21) Appl. No.: 10/492,696

(22) PCT Filed: Aug. 19, 2003

(86) PCT No.: PCT/JP03/10424
§ 371 (c)(1),
(2), (4) Date: Apr. 15, 2004

(87) PCT Pub. No.: WO2004/017634

PCT Pub. Date: Feb. 26, 2004

(65) Prior Publication Data

US 2004/0263684 A1    Dec. 30, 2004

(30) Foreign Application Priority Data

Aug. 19, 2002    (JP)    ............................. 2002-238005

(51) Int. Cl.
*H04N 7/01* (2006.01)
*H04N 11/20* (2006.01)
*G06K 9/32* (2006.01)
*G06K 9/40* (2006.01)

(52) U.S. Cl. ...................... 348/448; 348/452; 348/458; 348/700; 382/300

(58) Field of Classification Search ................ 348/448, 348/452, 458, 607, 700; 382/266, 300; *H04N 7/01, H04N 11/20; G06K 9/32, 9/40*
See application file for complete search history.

(56) References Cited

U.S. PATENT DOCUMENTS 4,661,853 A * 4/1987 Roeder et al. .............. 348/701
5,119,193 A   6/1992 Noji (Continued)

FOREIGN PATENT DOCUMENTS

JP    5-276493    10/1993

(Continued)

*Primary Examiner*—Brian P. Yenke
(74) *Attorney, Agent, or Firm*—Frommer Lawrence & Haug LLP; William S. Frommer

(57) ABSTRACT

Errors in interpolation when using diagonal interpolation can be reduced, thereby high-quality intra-field interpolation can be achieved. A further upper data line (41) and an upper data line (42) are inputted into an upper diagonal correlation detection portion (21), and the upper data line (42) and a lower data line (43) are inputted into a lower diagonal correlation detection portion (22). The lower diagonal correlation detection portion (22) determines correlation of pixels on actual data lines above and below an interpolation point in a left diagonal direction, a central direction and a right diagonal direction around the interpolation point. The upper diagonal correlation detection portion (21) determines correlation of pixels on actual data lines above and below an auxiliary interpolation point, which is secondarily set, in a left diagonal direction, a central direction and a right diagonal direction around, for example, the auxiliary interpolation point. On the basis of the determination results, a direction having a strong correlation is detected to produce interpolation data by using pixels in the interpolation direction.

11 Claims, 13 Drawing Sheets

U.S. PATENT DOCUMENTS

| | | |
|---|---|---|
| 5,742,348 A | 4/1998 | Kuwahara et al. |
| 5,796,437 A | 8/1998 | Muraji et al. |
| 5,886,745 A | 3/1999 | Muraji et al. |
| 6,421,090 B1* | 7/2002 | Jiang et al. .................. 348/452 |
| 6,522,785 B1* | 2/2003 | Kondo et al. ................. 382/254 |
| 6,608,699 B2* | 8/2003 | Kishimoto .................... 358/1.2 |
| 6,614,484 B1* | 9/2003 | Lim et al. ..................... 348/448 |
| 6,621,936 B1* | 9/2003 | Kondo et al. ................. 382/260 |
| 6,731,342 B2* | 5/2004 | Shin et al. ................... 348/452 |
| 6,795,123 B2* | 9/2004 | Gotanda et al. ............. 348/448 |
| 6,801,221 B2* | 10/2004 | Kawamura et al. .......... 345/698 |
| 6,924,844 B2* | 8/2005 | Kawamura et al. .......... 348/448 |
| 7,023,487 B1* | 4/2006 | Adams .......................... 348/448 |
| 2001/0035969 A1* | 11/2001 | Kishimoto .................... 358/1.9 |
| 2003/0011709 A1* | 1/2003 | Kasahara et al. ............ 348/452 |
| 2004/0126037 A1* | 7/2004 | Kim et al. .................... 382/300 |

FOREIGN PATENT DOCUMENTS

| | | |
|---|---|---|
| JP | 11-146346 | 5/1999 |
| JP | 11-164263 | 6/1999 |
| JP | 2001-94951 | 4/2001 |
| JP | 2002-185934 | 6/2002 |

* cited by examiner

IMAGE PROCESSING DEVICE AND METHOD, VIDEO DISPLAY DEVICE, AND RECORDED INFORMATION REPRODUCTION DEVICE

TECHNICAL FIELD

The present invention relates to an image processing apparatus and an image processing method for performing image interpolation accompanying, for example, conversion from interlaced scanning to sequential (progressive) scanning (IP conversion) or the like, a video display apparatus and a recorded information reproducing apparatus both comprising an image interpolation function such as IP conversion.

BACKGROUND ART

In a major TV (television) broadcast system, for example, the NTSC (National Television System Committee) TV broadcast system, 60 field images of 262.5 horizontal scanning lines are displayed each second to equivalently display 30 frames of images (the number of horizontal scanning lines per frame=525 lines) each second. Such a system combining two field images to make and display a frame image is called an interlaced system. On the contrary, a system displaying a frame image at a time without dividing the number of scanning lines is called a progressive system. While, for example, a field image of 262.5 horizontal scanning lines is displayed every $\frac{1}{60}$ of a second in the interlaced system, in the progressive system, a frame image of 525 horizontal scanning lines is displayed every $\frac{1}{60}$ of a second, so screen flicker is reduced, thereby a high-resolution image can be displayed. In some cases, a video standard in which a frame image of 525 scanning lines is displayed by the interlaced system is called "525i", and a video standard in which a frame image of 525 scanning lines is displayed by the progressive system is called "525p".

Conventionally, an IP converter for converting an interlaced image into a progressive image is known. When an interlaced image (for example, a field image of 262.5 scanning lines) is converted into a progressive image (for example, a frame image of 525 scanning lines), it is required to interpolate pixel data for a part which is not included in the original field image.

In the IP conversion, a process of interpolating pixel data changes depending upon a signal source in general. More specifically, in the case of still pictures, inter-field interpolation is performed, and in the case of moving pictures, intra-field interpolation is performed. For example, as shown in FIG. 11, assuming that a pixel h in a field FE2 is an interpolation point, in the inter-field interpolation, data is interpolated in the field FE2 to be interpolated using data in previous and following fields FE1 and FE3. On the other hand, in the intra-field interpolation, data is interpolated using data in the field FE2 to be interpolated. In the fields FE1, FE2 and FE3 in FIG. 11, a solid line indicates a line where video data actually exists, and a broken line indicates a line where interpolation data is produced.

Referring to FIG. 12, the concept of typical intra-field interpolation will be described below. FIG. 12 shows part of an arbitrary field image in the interlaced system. In the drawing, lines W and X indicate pixel lines (actual data lines) where video data actually exists. A line Y indicates a line where video data exists in a field previous to or following the present field as well as a line (interpolation data line) where interpolation data is produced during intra-field interpolation. A symbol ○ on each line indicates a position where a pixel exists.

In FIG. 12, assuming that the pixel h is a point to be interpolated, as a simple technique of intra-field interpolation, for example, there is a method using a value (average value) determined by dividing the sum of pixel data (such as luminance or chroma data) of pixels c and m directly above and directly below the pixel h by two as interpolation data. As another technique of intra-field interpolation, there is a technique called "diagonal interpolation". A method of interpolating data in a pixel to be interpolated from two adjacent actual data lines W and X above and below the pixel by the diagonal interpolation is described in, for example, Published Japanese translation of PCT International Publication for Japanese Patent Application No. 2001-506113.

The diagonal interpolation is a technique of determining interpolation data by calculation referring to not only pixels directly above and directly below the pixel to be interpolated but also pixels in diagonal directions. For example, interpolation data is determined by calculation referring to pixels on the actual data lines W and X on not only an interpolation axis C1 in a vertical (central) direction but also interpolation axes L2 and L1 in left diagonal directions and interpolation axes R2 and R1 in right diagonal directions around the pixel h which is the interpolation point. In this case, a combination with the strongest correlation is detected among combinations of pixels on each interpolation axis, that is, (a–o), (b–n), (c–m), (d–l) and (e–k), and by using the data, data of the pixel h is interpolated.

In order to detect correlation, for example, subtraction of each pixel data is performed to obtain its absolute value. For example, the correlation of the combination of the pixels (d–l) is expressed by Formula 1 below. ABS means obtaining an absolute value. In this method, in the case of data with a strong correlation, the value of Formula 1 is small.

$$ABS(d-l) \quad \text{(Formula 1)}$$

However, in the method using Formula 1, only correlation between one pixel and one pixel is determined, so even if data is originally and completely irrelevant to a video sequence, a strong correlation may be shown (that is, a wrong interpolation axis may be selected), thereby inadequate interpolation data is often produced. For example, as shown in FIG. 13, in the case of an image with the shape of a thin line in a direction of the interpolation axis R1, an interpolation axis in a direction different from an adequate direction may be selected by mistake. Therefore, in general, correlation is detected using some data considered as a group.

For example, as shown in Formula 2 below, in order to detect correlation between data of a pixel d and data of a pixel l, a data group 2-1 (c, d and e) around the pixel d and a data group 2-2 (k, l and m) around the pixel l are used, thereby errors in correlation detection can be reduced.

$$ABS(c-k)+ABS(d-l)+ABS(e-m) \quad \text{(Formula 2)}$$

In the case of Formula 2, like Formula 1, the stronger the correlation is, the smaller the calculation result becomes. However, even in a method using Formula 2, in the case of an image with a strong correlation in right and left diagonal directions, a strong correlation in a wrong diagonal direction is detected, thereby as a result, inadequate interpolation data may be produced.

Thus, in the intra-field interpolation using conventional diagonal interpolation, in the case where an optimum reference pixel is detected from two adjacent pixel lines above and below the interpolation point in a diagonal direction, when an pixel with the same luminance exists, a strong correlation is shown, thereby resulting in a problem that a pixel in a diagonal direction irrelevant to a video sequence is interpolated by mistake.

In view of the foregoing, it is an object of the invention to provide an image processing apparatus, an image processing method a video display apparatus and a recorded information reproducing apparatus capable of reducing errors in interpolation in the case of using diagonal interpolation to perform high-quality intra-field interpolation.

DISCLOSURE OF THE INVENTION

An image processing apparatus according to the invention comprises: a first correlation detection portion detecting correlation of pixels on a first pixel line and a second pixel line vertically or horizontally adjacent to a pixel to be interpolated in a plurality of directions around the pixel to be interpolated; a second correlation detection portion detecting at least one of correlation between a pixel on the first pixel line and a pixel on a third pixel line positioned two lines away from the pixel to be interpolated in a direction of the first pixel line or correlation between a pixel on the second pixel line and a pixel on a fourth pixel line positioned two lines away from the pixel to be interpolated in a direction of the second pixel line in a plurality of directions around an auxiliary pixel set in a position different from the pixel to be interpolated; a determining means determining an interpolation direction on the basis of detection results of the first correlation detection portion and the second correlation detection portion; and a producing means producing interpolation data of the pixel to be interpolated referring to data of pixels on the first pixel line and the second pixel line existing in the determined interpolation direction. In the second correlation portion, if correlation between a pixel on the first pixel line and a pixel on the third pixel line is determined, a pixel on an imaginary line set between the first pixel line and the third pixel line is set as the auxiliary pixel, and if correlation between a pixel on the second pixel line and a pixel on the fourth pixel line is determined, a pixel on an imaginary line set between the second pixel line and the fourth pixel line is set as the auxiliary pixel.

An image processing method according to the invention comprises: a first detection step of detecting correlation of pixels on a first pixel line and a second pixel line vertically or horizontally adjacent to a pixel to be interpolated in a plurality of directions around the pixel to be interpolated; a second detection step of detecting at least one of correlation between a pixel on the first pixel line and a pixel on a third pixel line positioned two lines away from the pixel to be interpolated in a direction of the first pixel line or correlation between a pixel on the second pixel line and a pixel on a fourth pixel line positioned two lines away from the pixel to be interpolated in a direction of the second pixel line in a plurality of directions around an auxiliary pixel set in a position different from the pixel to be interpolated; a step of determining an interpolation direction on the basis of detection results of the first detection step and the second detection step; and a step of producing interpolation data of the pixel to be interpolated referring to data of pixels on the first pixel line and the second pixel line existing in the determined interpolation direction. In the second detection step, if correlation between a pixel on the first pixel line and a pixel on the third pixel line is determined, a pixel on an imaginary line set between the first pixel line and the third pixel line is set as the auxiliary pixel, and if correlation between a pixel on the second pixel line and a pixel on the fourth pixel line is determined, a pixel on an imaginary line set between the second pixel line and the fourth pixel line is set as the auxiliary pixel.

A video display apparatus according to the invention comprises: an image processing portion performing intra-field interpolation on input video signals; and a display portion displaying pictures on the basis of the video signals processed by the image processing portion. The image processing portion comprises: a first correlation detection portion detecting correlation of pixels on a first pixel line and a second pixel line vertically or horizontally adjacent to a pixel to be interpolated in a plurality of directions around the pixel to be interpolated; a second correlation detection portion detecting at least one of correlation between a pixel on the first pixel line and a pixel on a third pixel line positioned two lines away from the pixel to be interpolated in a direction of the first pixel line or correlation between a pixel on the second pixel line and a pixel on a fourth pixel line positioned two lines away from the pixel to be interpolated in a direction of the second pixel line in a plurality of directions around an auxiliary pixel set in a position different from the pixel to be interpolated; a determining means determining an interpolation direction on the basis of detection results of the first correlation detection portion and the second correlation detection portion; and a producing means producing interpolation data of the pixel to be interpolated referring to data of pixels on the first pixel line and the second pixel line existing in the determined interpolation direction. In the second correlation detection portion, if correlation between a pixel on the first pixel line and a pixel on the third pixel line is determined, a pixel on an imaginary line set between the first pixel line and the third pixel line is set as the auxiliary pixel, and if correlation between a pixel on the second pixel line and a pixel on the fourth pixel line is determined, a pixel on an imaginary line set between the second pixel line and the fourth pixel line is set as the auxiliary pixel.

An recorded information reproducing apparatus according to the invention reproduces signals obtained through performing intra-field interpolation on video information recorded on a recording medium to output the signals, and as means for performing the intra-field interpolation, the recorded information reproducing apparatus comprises: a first correlation detection portion detecting correlation of pixels on a first pixel line and a second pixel line vertically or horizontally adjacent to a pixel to be interpolated in a plurality of directions around the pixel to be interpolated; a second correlation detection portion detecting at least one of correlation between a pixel on the first pixel line and a pixel on a third pixel line positioned two lines away from the pixel to be interpolated in a direction of the first pixel line or correlation between a pixel on the second pixel line and a pixel on a fourth pixel line positioned two lines away from the pixel to be interpolated in a direction of the second pixel line in a plurality of directions around an auxiliary pixel set in a position different from the pixel to be interpolated; a determining means determining an interpolation direction on the basis of detection results of the first correlation detection portion and the second correlation detection portion; and a producing means producing interpolation data of the pixel to be interpolated referring to data of pixels on the first pixel line and the second pixel line existing in the determined interpolation direction. In the second correlation detection portion, if correlation between a pixel on the first pixel line and a pixel on the third pixel line is determined, a pixel on an imaginary line set between the first pixel line and the third pixel line is set as the auxiliary pixel, and if correlation between a pixel on the second pixel line and a pixel on the fourth pixel line is determined, a pixel on an imaginary line set between the second pixel line and the fourth pixel line is set as the auxiliary pixel.

In the image processing apparatus, the image processing method, the video display apparatus and the recorded information reproducing apparatus according to the invention, "a pixel line" indicates a line including pixels continued in a vertical direction or a horizontal direction.

In the image processing apparatus, the image processing method, the video display apparatus and the recorded information reproducing apparatus according to the invention, correlation of pixels on the first pixel line and the second pixel line vertically or horizontally adjacent to the pixel to be interpolated is detected in a plurality of directions around the pixel to be interpolated. Moreover, at least one of correlation between a pixel on the first pixel line and a pixel on a third pixel line positioned two lines away from the pixel to be interpolated in a direction of the first pixel line or correlation between a pixel on the second pixel line and a pixel on a fourth pixel line positioned two lines away from the pixel to be interpolated in a direction of the second pixel line is detected in a plurality of directions around an auxiliary pixel set in a position different from the pixel to be interpolated. According to the detection results, an interpolation direction is determined, and interpolation data of the pixel to be interpolated is produced referring to pixel data on the first pixel line and the second pixel line existing on the determined interpolation direction, so compared to the case where diagonal interpolation is performed referring to only two pixel lines, diagonal interpolation with less errors can be performed.

If correlation between a pixel on the first pixel line and a pixel on the third pixel line is determined, a pixel on an imaginary line set between the first pixel line and the third pixel line is set as the auxiliary pixel. If correlation between a pixel on the second pixel line and a pixel on the fourth pixel line is determined, a pixel on an imaginary line set between the second pixel line and the fourth pixel line is set as the auxiliary pixel.

In this case, it is preferable that a pixel closest to the pixel to be interpolated, or a pixel in proximity to a pixel closest to the pixel to be interpolated on the imaginary line is set as the auxiliary pixel, because a pixel data range referred for determining correlation can be reduced. The "pixel in proximity" indicates a pixel in a range including a few pixels around the pixel closest to the pixel to be interpolated. For example, if interpolation of a pixel line in a vertical direction such as IP conversion is performed, the first pixel line and the second pixel line are positioned above and below the pixel to be interpolated, and the third pixel line is positioned above the first pixel line. In this case, a pixel directly above the pixel to be interpolated or a pixel positioned a few pixels away from the pixel directly above the pixel to be interpolated on the imaginary line between the first pixel line and the second pixel line is set as the auxiliary pixel.

BEST MODE FOR CARRYING OUT THE INVENTION

A preferred embodiment of the invention will be described in more detail below referring to the accompanying drawings.

Figure 1:
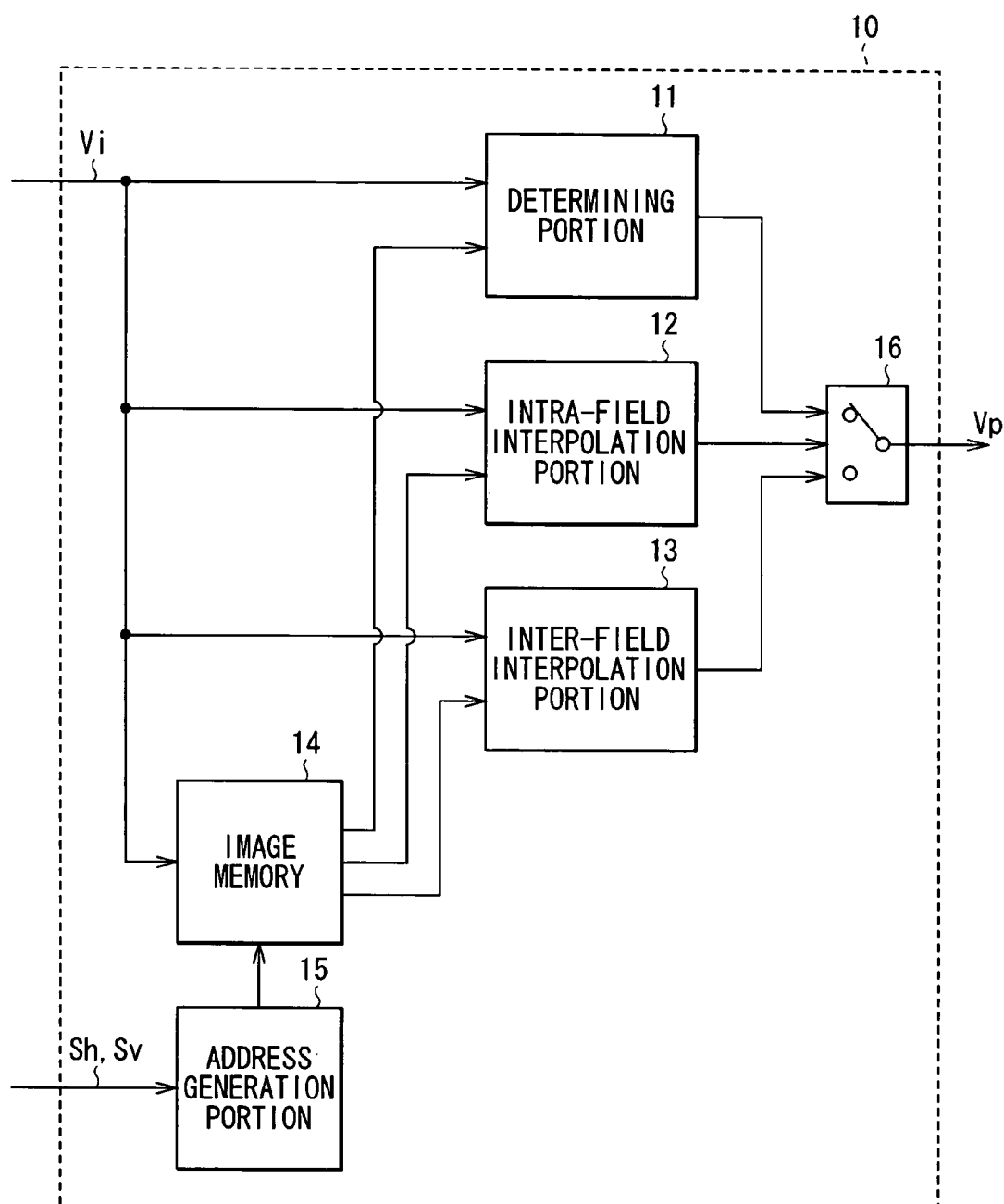
FIG. 1 is a block diagram of the whole structure of an IP converter as an image processing apparatus according to an embodiment of the invention.

FIG. 1 shows the whole structure of an IP converter as an image processing apparatus according to an embodiment. An IP converter 10 converts interlaced video signals Vi such as 525i, 625i and 1125i into progressive video signals Vp such as 525p, 625p and 1125p.

The IP converter 10 comprises a determining portion 11 determining whether intra-field interpolation or inter-field interpolation should be used to process the inputted video signals Vi, an intra-field interpolation portion 12 performing intra-field interpolation on the inputted video signals Vi, and an inter-field interpolation portion 13 performing inter-field interpolation on the inputted video signals Vi.

The IP converter 10 further comprises an image memory 14 recording, for example, two fields of inputted video signals Vi, and an address generation portion 15 generating read and write addresses of data in the image memory 14 on the basis of horizontal and vertical synchronizing signals Sh and Sv. The IP converter 10 further comprises a switch portion 16 selecting signals from either the intra-field interpolation portion 12 or the inter-field interpolation portion 13 as final output signals Vp on the basis of determination by the determining portion 11 to output the signals.

The intra-field interpolation portion 12 is the most characteristic part of the IP converter 10. The intra-field interpolation portion 12 performs intra-field interpolation using diagonal interpolation, and uses data of at least three pixel lines in order to determine an interpolation direction (interpolation axis).

Figure 5:
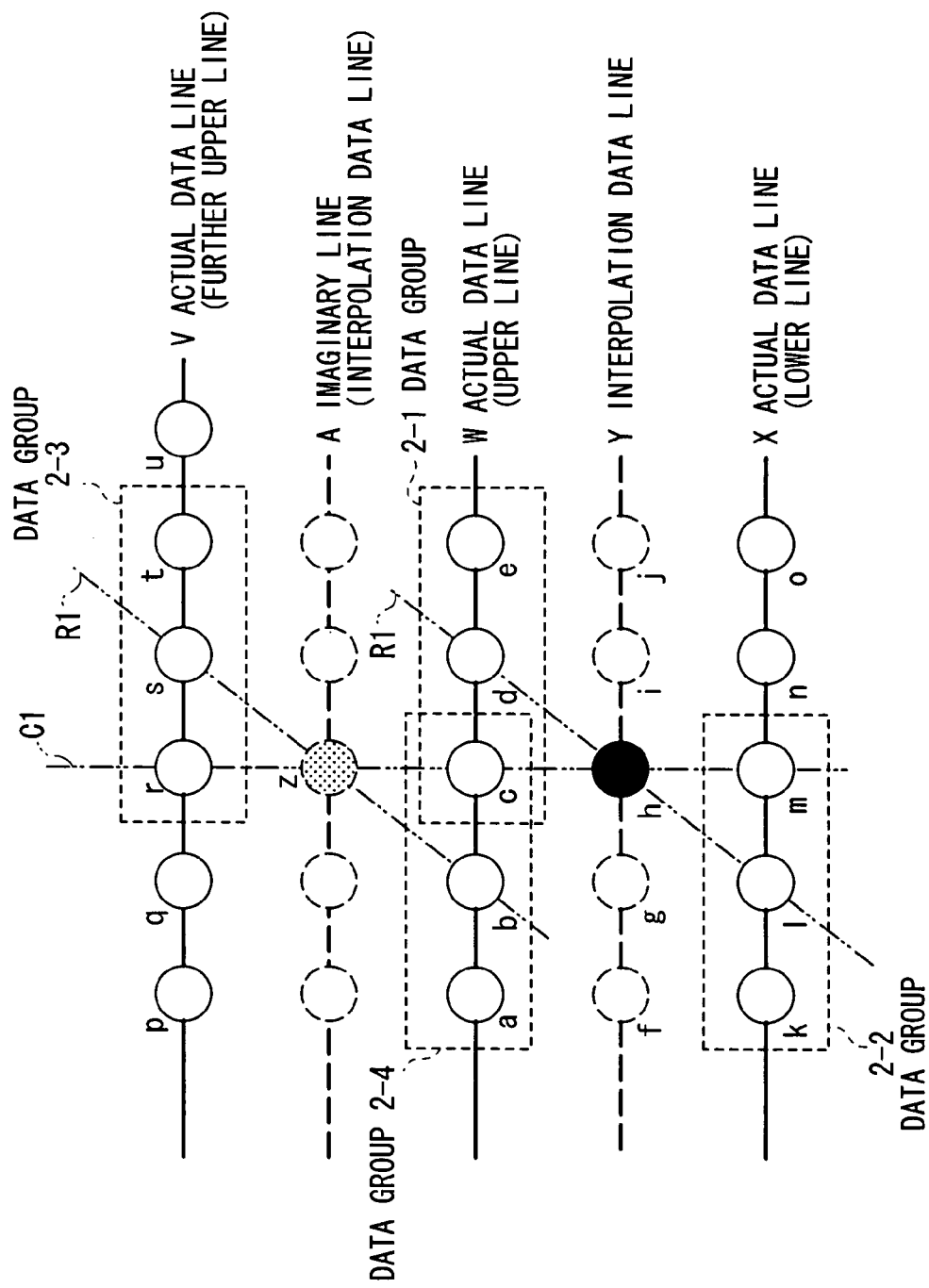
FIG. 5 is an illustration for describing intra-field interpolation.

For example, as shown in FIG. 5, assuming that a pixel h is a point to be interpolated, lines W and X adjacent to the pixel h in upper and lower vertical directions and at least one other pixel line are used. As the other pixel line, a line V positioned above the line W (a pixel line positioned two lines away from the pixel h in a direction of the line W) or a line positioned below the line X (a pixel line positioned two lines away from the pixel h in a direction of the line X)

is used. In the embodiment, the case where interpolation is performed referring to data of three lines including two lines V and W above the pixel h and one line X below the pixel h in total will be described as an example.

FIG. 5 shows a part of an arbitrary interlaced field image. In the drawing, the lines V, W and X indicate pixel lines (actual data lines) where video data (such as luminance and chroma data) actually exists. Lines A and Y indicate lines where video data exists in a field previous to or following the present field, as well as lines where interpolation data is produced during intra-field interpolation. A symbol ○ on each line indicates a position where a pixel exists. Hereinafter the pixel h on the line Y is described as an interpolation point, and the line Y is specifically called an "interpolation data line". Moreover, in the embodiment, in order to determine an interpolation direction when obtaining interpolation data of the pixel h, a pixel z on the line A is set as an auxiliary interpolation point. Hereinafter the line A is specifically called an "imaginary line". As shown in the drawing, the pixel z of the auxiliary interpolation point is set on the line A directly above the pixel h which is the interpolation point, for example.

Herein, in the embodiment, the actual data lines W and X correspond to specific examples of "a first pixel line" and "a second pixel line" in the invention, respectively. Moreover, the actual data line V corresponds to a specific example of "a third pixel line" in the invention. Further, an actual data line (not shown) directly below the actual data line X corresponds to a specific example of "a fourth pixel line" in the invention.

Figure 2:
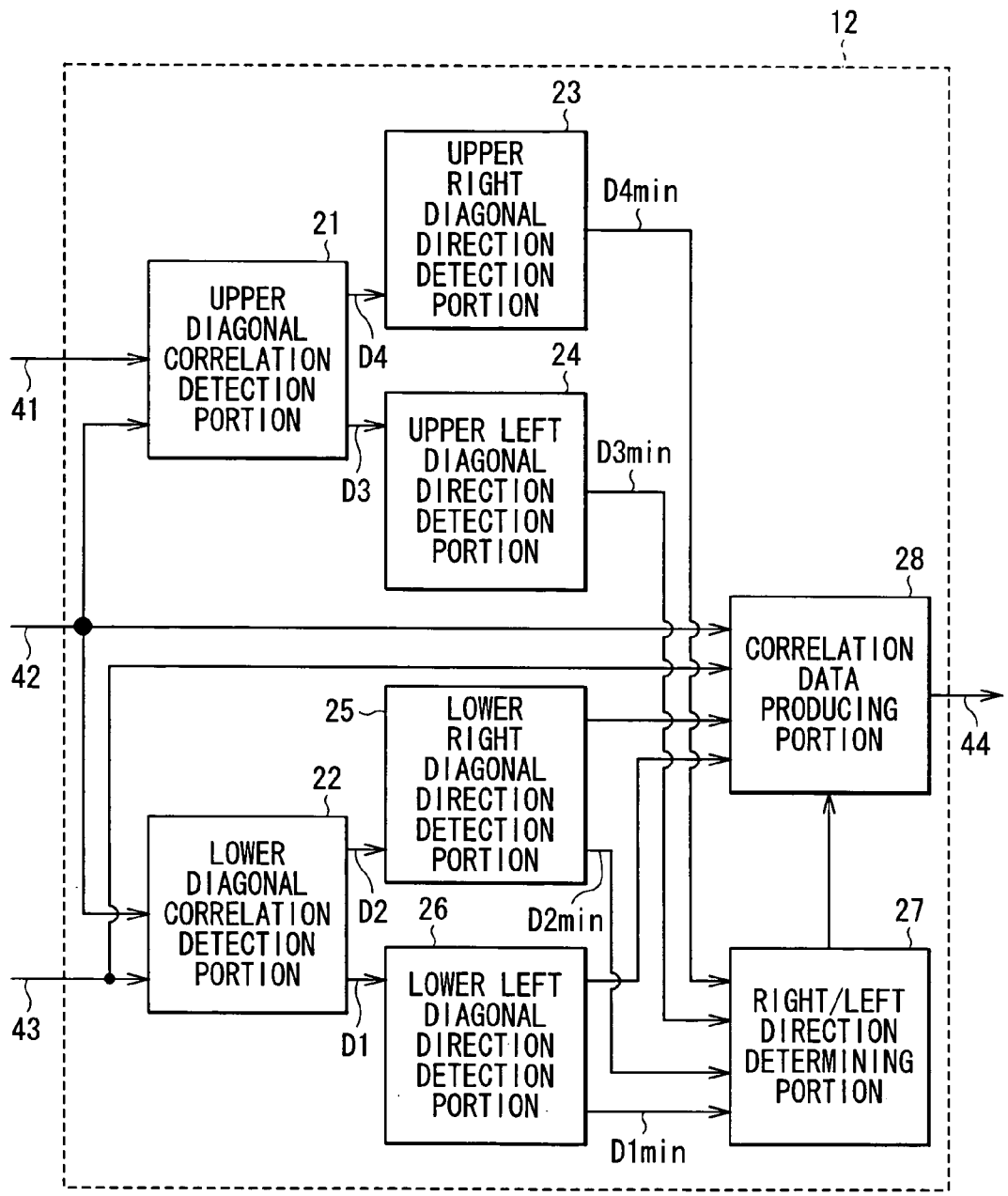
FIG. 2 is a block diagram of a detailed structure of an intra-field interpolation portion in the IP converter shown in FIG. 1.

FIG. 2 shows a detailed structure of the intra-field interpolation portion 12 which is a characteristic part of the IP converter 10. A further upper data line 41, an upper data line 42 and a lower data line 43 are inputted into the intra-field interpolation portion 12. The upper data line 42 indicates a data line including a few pixels positioned above the interpolation point (the pixel h) from side to side, and, for example, the pixels correspond to pixels a, b, c, d and e on the actual data line W shown in FIG. 5. The lower data line 43 indicates a data line including a few pixels positioned below the interpolation point (the pixel h) from side to side, and, for example, the pixels correspond to pixels k, l, m, n and o on the actual data line X. The further upper data line 41 indicates a data line including a few pixels positioned above the auxiliary interpolation point (the pixel z) from side to side, and, for example, the pixels correspond to pixels p, q, r, s and t on the actual data line V.

Figure 6:
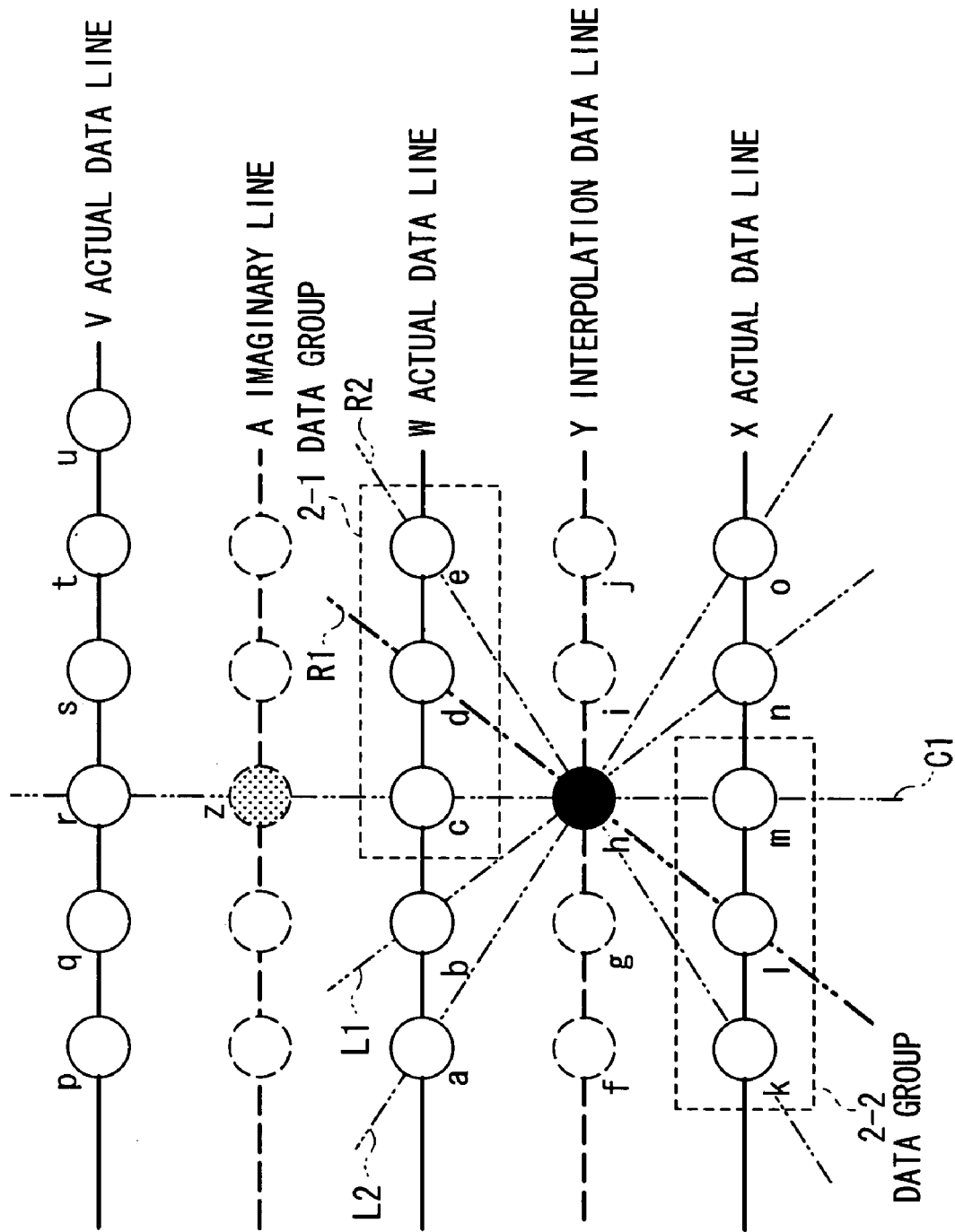
FIG. 6 is an illustration for describing correlation detection around an interpolation point.
Figure 7:
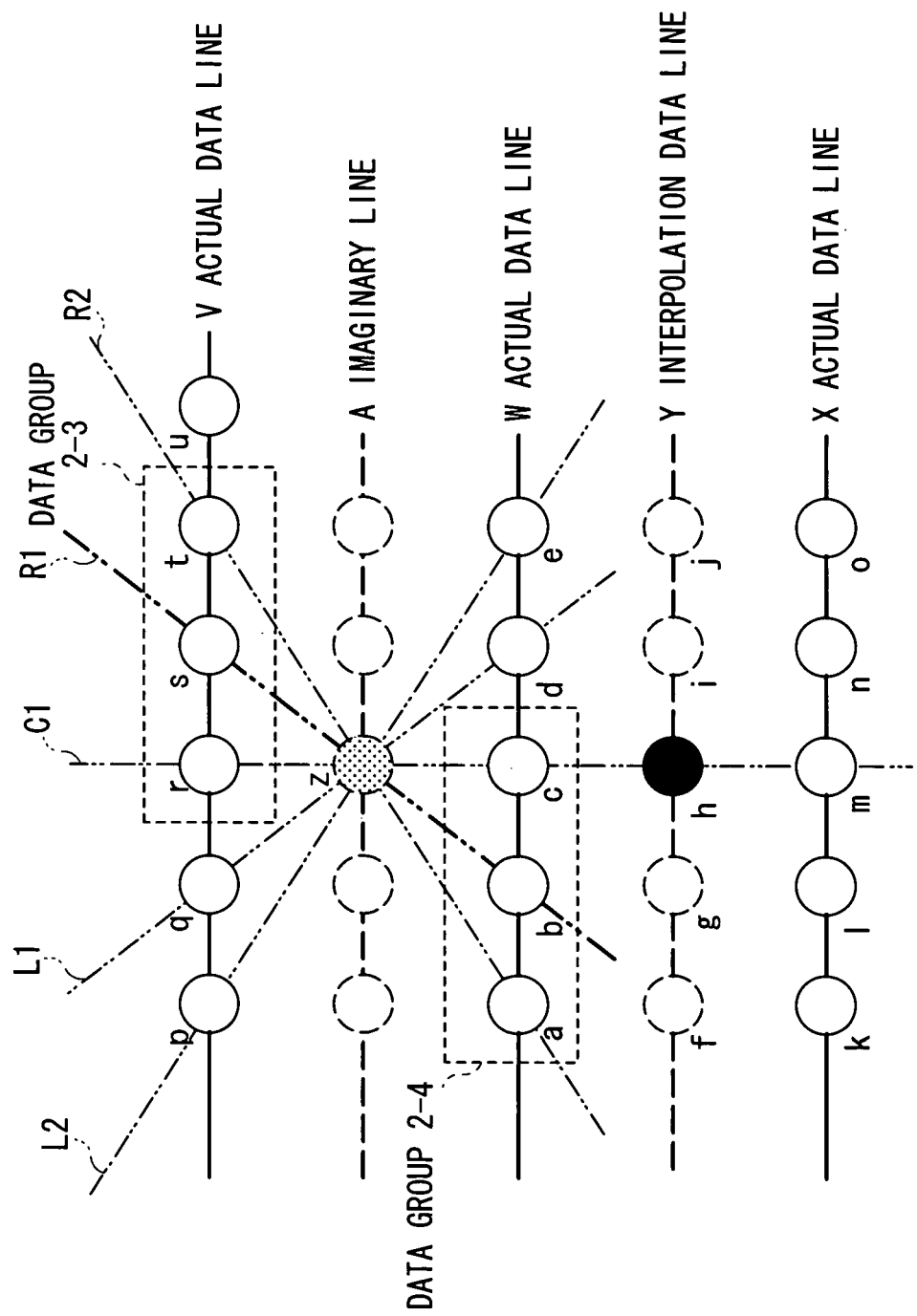
FIG. 7 is an illustration for describing correlation detection around an auxiliary interpolation point.

The intra-field interpolation portion 12 includes an upper diagonal correlation detection portion 21 and a lower diagonal correlation detection portion 22. The upper diagonal correlation detection portion 21 determines correlation of pixels on each interpolation axis in a plurality of directions (that is, a left diagonal direction, a central direction and a right diagonal direction) around the pixel z of the auxiliary interpolation point on the basis of the further upper data line 41 and the upper data line 42. For example, as shown in FIG. 7, the upper diagonal correlation detection portion 21 determines correlation of pixels on two interpolation axes L2 and L1 in left diagonal directions, an interpolation axis C1 in a central direction and two interpolation axes R2 and R1 in right diagonal directions on the actual data lines V and W around the pixel z. The lower diagonal correlation detection portion 22 determines correlation of pixels on each interpolation axis in a plurality of directions around the pixel h of the interpolation point on the basis of the upper data line 42 and the lower data line 43. In other words, as in the case of the upper diagonal correlation detection portion 21, for example, as shown in FIG. 6, the lower diagonal correlation detection portion 22 determines correlation of pixels on two interpolation axes L2 an L1 in left diagonal directions, the interpolation axis C1 in a central direction and two interpolation axes R2 and R1 in right diagonal directions. A specific way to determine the correlation will be described later.

The intra-field interpolation portion 12 further includes an upper right diagonal direction detection portion 23 and an upper left diagonal direction detection portion 24. The upper right diagonal direction detection portion 23 selects data D4min having the strongest correlation from correlation data D4 of pixels on the interpolation axis C1 in a central direction and the interpolation axes R2 and R1 in right diagonal directions which are determined by the upper diagonal correlation detection portion 21 to output the data D4min. The upper left diagonal direction detection portion 24 selects data D3min having the strongest correlation from correlation data D3 of pixels on the interpolation axis C1 in a central direction and the interpolation axes L2 and L1 in left diagonal directions which are determined by the upper diagonal correlation detection portion 21 to output the data D3min.

The intra-field interpolation portion 12 further includes a lower right diagonal direction detection portion 25 and a lower left diagonal direction detection portion 26. The lower right diagonal direction detection portion 25 selects data D2min having the strongest correlation from correlation data D2 of pixels on the interpolation axis C1 in a central direction and the interpolation axes R2 and R1 in right diagonal directions which are determined by the lower diagonal correlation detection portion 22 to output the data D2min. The lower left diagonal direction detection portion 26 selects data D1min having the strongest correlation from correlation data D1 of pixels on the interpolation axis C1 and the interpolation axes L2 and L1 in left diagonal directions which are determined by the lower diagonal correlation detection portion 22 to output the data D1min.

The intra-field interpolation portion 12 further includes a right/left direction determining portion 27 and a correlation data producing portion 28. The right/left direction determining portion 27 determines a direction of the interpolation axis on the basis of output data D4min, D3min, D2min and D1min from the upper right diagonal direction detection portion 23, the upper left diagonal direction detection portion 24, the lower right diagonal direction detection portion 25 and the lower left diagonal direction detection portion 26, respectively. The correlation data producing portion 28 produces correlation data of the pixel h which is the interpolation point by using pixel data in the direction of the interpolation axis determined by the right/left direction determining portion 27.

Herein, in the embodiment, the lower diagonal correlation detection portion 22 corresponds to a specific example of "a first correlation detection portion" in the invention, and the upper diagonal correlation detection portion 21 corresponds to a specific example of "a second correlation detection portion" in the invention. Moreover, in the embodiment, the right/left direction determining portion 27 mainly corresponds to a specific example of "a determining means" in the invention. The correlation data producing portion 28 corresponds to a specific example of "a producing means" in the invention.

Figure 3:
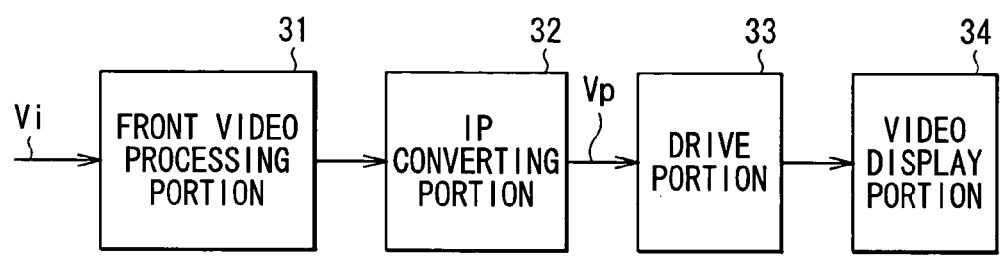
FIG. 3 is a block diagram of an example of a video display apparatus to which the image processing apparatus according to the embodiment of the invention is applied.

FIG. 3 shows an example of a vide display apparatus using the IP converter 10. The video display apparatus comprises s front video processing portion 31, an IP converting portion 32, a drive portion 33 and a video display portion 34.

The front video processing portion 31 performs signal processing such as A/D conversion on interlaced input video signals Vi to output the processed video signals Vi to the IP converting portion 32. The IP converting portion 32 comprises the above-described IP converter 10, and converts the video signals Vi inputted through the front video processing portion 31 into progressive video signals Vp to output the video signals Vp.

The video display portion 34 is a portion where pictures are actually displayed on the basis of the video signals Vp. The video display portion 34 is driven by the drive portion 33. The structure of the video display portion 34 is not specifically limited, and for example, a CRT (cathode ray tube), a LCD (liquid crystal display), a PDP (plasma display panel) or the like can be used as the vide display portion 34.

Figure 4:
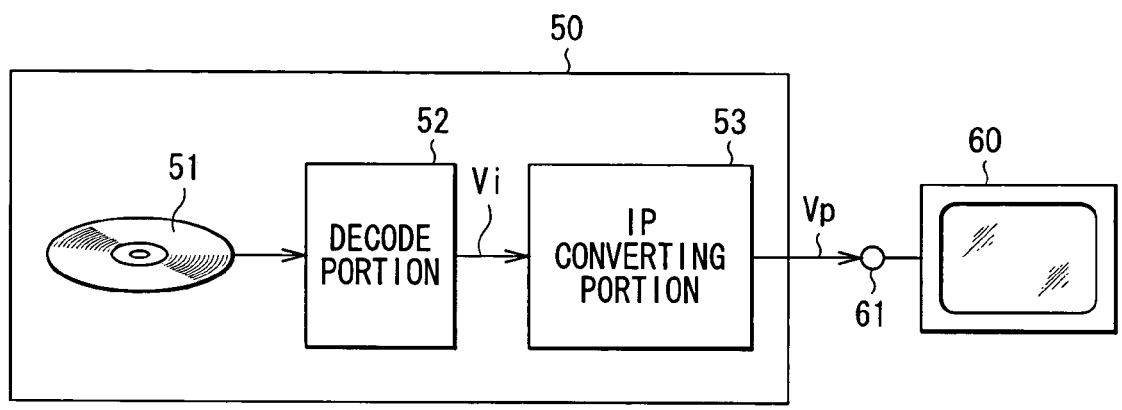
FIG. 4 is a block diagram of an example of a recorded information reproducing system using the image processing apparatus according to the embodiment of the invention.

FIG. 4 shows an example of a recorded information reproducing system using the IP converter 10. The system comprises a recorded information reproducing apparatus 50 and a video display apparatus 60 displaying pictures reproduced by the recorded information reproducing apparatus 50.

The recorded information reproducing apparatus 50 reproduces video information recorded on an information recording medium 51. The information recording medium 51 is a DVD (digital versatile disk) or the like, and at least interlaced video information is recorded on the information recording medium 51. When the information recording medium 51 is the DVD, the video information compressed and encoded according to MPEG (Moving Picture Experts Group) standards is recorded on the information recording medium 51.

The recorded information reproducing apparatus 50 comprises a decode portion 52 and an IP converting portion 53. The decode portion 52 decodes video information recorded on the information recording medium 51 to output interlaced video signals Vi. The IP converting portion 53 includes the above-described IP converter 10, and converts the interlaced video signals Vi inputted through the decode portion 52 into progressive video signals Vp to output the progressive video signals Vp.

The structure of the video display apparatus 60 is not specifically limited, and, for example, a CRT, a LCD, a PDP or the like can be used as the video display apparatus 60. The video display apparatus 60 comprises a video input terminal 61 for the progressive video signals Vp such as a D terminal, and has a function of displaying pictures on the basis of the video signals Vp inputted through the video input terminal 61.

Next, actions of the IP converter 10 structured as described above, the video display apparatus and the recorded information reproducing system using the IP converter 10 will be described below.

The interlaced video signals Vi such as 525i, 625i and 1125i are inputted into the IP converter 10 shown in FIG. 1. For example, two fields of input video signals Vi previous to the present field are inputted into the image memory 14. In the intra-field interpolation portion 12, intra-field interpolation is performed on the inputted video signals Vi through a method which will be described later, and then progressive video signals Vp obtained thereby are outputted into the switch portion 16. In the inter-field interpolation portion 13, inter-field interpolation is performed on the inputted video signals Vi, and then the progressive video signals Vp obtained thereby are outputted into the switch portion 16.

The determining portion 11 determines whether signals obtained by the inter-field interpolation or the intra-field interpolation should be outputted as final output signals Vp on the basis of the video signals Vi of the present field, and video signals Vi of the previous field recorded in the image memory 14, and controls switching of the switch portion 16 on the basis of the determined result. For example, in case the video signals Vi are determined as moving pictures, the signals on which intra-field interpolation is performed by the intra-field interpolation portion 12 are outputted as the final output signals Vp. Moreover, for example, in case the video signals Vi are determined as still pictures, the signals on which inter-field interpolation is performed by the inter-field interpolation portion 13 are outputted as the final output signals Vp.

In the video display apparatus shown in FIG. 3, signal processing such as A/D conversion is performed on the interlaced input video signals Vi in the front video processing portion 31. The IP converting portion 32 converts the video signals Vi inputted through the front video processing portion 31 into the progressive video signals Vp to output them. The drive portion 33 drives the video display portion 34 on the basis of the progressive video signals Vp, thereby the video display portion 34 displays progressive pictures.

In the recorded information reproducing system shown in FIG. 4, video information recorded on the information recording medium 51 such as DVD is decoded by the decode portion 52, and then the decoded video information is outputted into the IP converting portion 53 as the interlaced video signals Vi. In the IP converting portion 53, the decoded video signals Vi are converted into the progressive video signals Vp. The converted video signals Vp are outputted from the recorded information reproducing apparatus 50 to the video input terminal 61 in the video display apparatus 60. In the video display apparatus 60, progressive pictures are displayed on the basis of the video signals Vp inputted through the video input terminal 61.

Next, processing actions of the intra-field interpolation portion 12 (refer to FIG. 2) which is a characteristic part of the IP converter 10 will be described below.

In the intra-field interpolation portion 12, the further upper data line 41 and the upper data line 42 are inputted into the upper diagonal correlation detection portion 21, and the upper data line 42 and the lower data line 43 are inputted into the lower diagonal correlation detection portion 22. For example, as shown in FIG. 7, the upper diagonal correlation detection portion 21 determines correlation of pixels on two interpolation axes L2 and L1 in left diagonal directions, the interpolation axis C1 in a central direction, and two interpolation axes R2 and R1 in right diagonal directions on the actual data lines V and W around the pixel z of the auxiliary interpolation point. The lower diagonal correlation detection portion 22 determines correlation of pixels on two interpolation axes L2 and L1 in left diagonal directions, the interpolation axis C1 in a central direction, and two interpolation axes R2 and R1 in right diagonal directions on the actual lines W and X around the pixel h of the interpolation point.

When correlation detection of pixels by the upper diagonal correlation detection portion 21 and the lower diagonal correlation detection portion 22 is performed using not only a pixel on each interpolation axis but also a plurality of pixels including the pixel on the interpolation axis considered as a group, the accuracy of the correlation detection can be improved.

For example, in the lower diagonal correlation detection portion 22, when correlation between data of the pixel d and data of the pixel l on the interpolation axis R1 is detected, as shown in FIG. 6, errors in the correlation detection can be reduced by using a data group 2-1 (pixels c, d and e) around the pixel d and a data group 2-2 (pixels k, l and m) around the pixel l, thereby the detection accuracy can be improved.

More specifically, as shown in Formula 3 below, the correlation using the data groups 2-1 and 2-2 can be determined by calculating the sum (DiffGroup) of difference absolute values of the data groups.

DiffGroup right 1=α1*ABS(c−k)+α2*ABS(d−l)+ α3*ABS(e−m)     (Formula 3)

In Formula 3, * indicates a multiplication symbol, and ABS means to obtain an absolute value. For example, ABS(c−k) means a difference absolute value between data of the pixel c and data of pixel k. Moreover, α1, α2 and α3 are predetermined coefficients. For example, in α1, α2 and α3, a larger value is set for (that is, lager weights are assigned to) a group closer to the center (that is, ABS(d−l)) among the groups. In this case, three pixels per line constitute one group, but the number of pixels can be increased.

DiffGroup right 1 in Formula 3 is an arithmetic expression of groups of the pixels d and l in one right diagonal direction (on the interpolation axis R1), and arithmetic in other axis directions can be performed in a like manner. Thus, the lower diagonal correlation detection portion 22 determines values of DiffGroup left 2, DiffGroup left 1, DiffGroup center, DiffGroup right 1 and DiffGroup right 2 in directions of axes L2, L1, C1, R1 and R2, respectively, around the pixel h of the interpolation point as correlation. A smaller sum of difference absolute values determined by Formula 3 means stronger correlation of the combination of the groups.

In a like manner, the upper diagonal correlation detection portion 21 determines the sum of difference absolute values of data groups on the actual data lines V and W around the auxiliary interpolation point (pixel z) on the imaginary line A through the technique using Formula 3 to detect the correlation of the combination of each group. For example, when the correlation between data of pixel s and data of pixel b on the interpolation axis R1 is detected, as shown in FIG. 7, the correlation is detected by using a data group 2-3 (pixels r, s and t) around the pixel s and a data group 2-4 (pixels a, b and c) around the pixel b.

The data of correlation calculated by the lower diagonal correlation detection portion 22 is inputted into the lower right diagonal direction detection portion 25 and the lower left diagonal direction detection portion 26. The lower right diagonal direction detection portion 25 selects the data D2min having the strongest correlation (a small DiffGroup) from the inputted data D2 (DiffGroup center, DiffGroup right 1 and DiffGroup right 2) to output the data D2min. The lower left diagonal direction detection portion 26 selects the data D1min having the strongest correlation from the inputted data D1 (DiffGroup center, DiffGroup left 1 and DiffGroup left 2) to output the data D1min.

The data of correlation calculated by the upper diagonal correlation detection portion 21 is inputted into the upper right diagonal direction detection portion 23 and the upper left diagonal direction detection portion 24. As in the case of the lower right diagonal direction detection portion 25 and the lower left diagonal direction detection portion 26, the upper right diagonal direction detection portion 23 and the upper left diagonal direction detection portion 24 select the data D4min and D3min both having the strongest correlation from the inputted DiffGroup data D4 and D3, respectively, to output them.

The output data D4min, D3min, D2min and D1min from the upper right diagonal direction detection portion 23, the upper left diagonal direction detection portion 24, the lower right diagonal direction detection portion 25 and the lower left diagonal direction detection portion 26, respectively, are transmitted to the right/left direction determining portion 27, and then the right/left direction determining portion 27 determines a direction of an interpolation axis used to determine interpolation data by calculation. The concept until the direction of the interpolation axis is determined by the right/left direction determining portion 27 is shown in FIG. 8.

Figure 8:
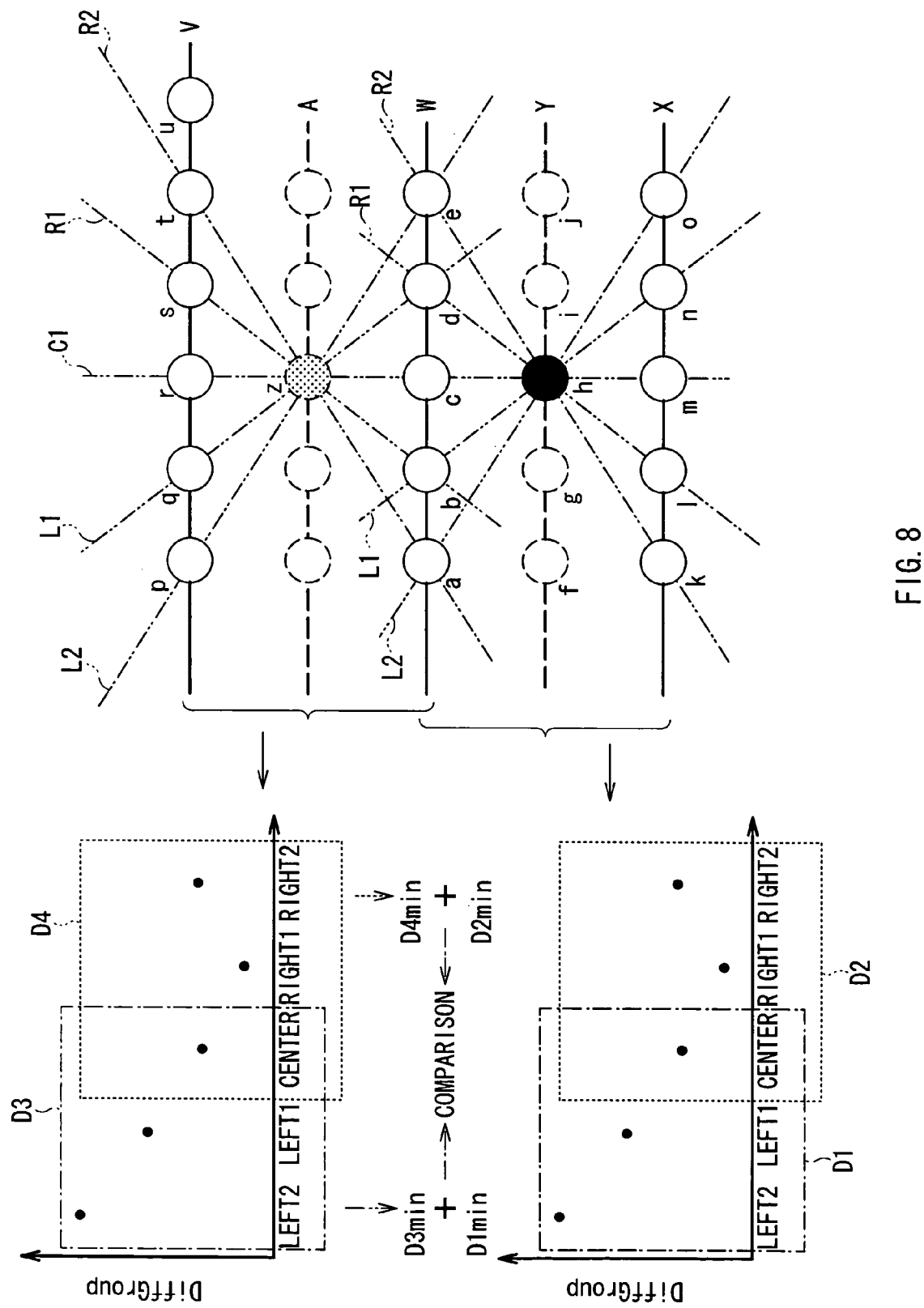
FIG. 8 is an illustration for describing a general flow of correlation detection.

As shown in FIG. 8, in the right/left direction determining portion 27, the DiffGroup data D4min selected by the upper right diagonal direction detection portion 23 and the DiffGroup data D2min selected by the lower right diagonal direction detection portion 25 are added together to calculate correlation regarding a direction of a right interpolation axis. Moreover, the DiffGroup data D3min selected by the upper left diagonal direction detection portion 24 and the DiffGroup data D1min selected by the lower left diagonal direction detection portion 26 are added together to calculate correlation regarding a direction of a left interpolation axis. A smaller value between two calculation results on the right side and the left side is assumed to have a stronger correlation, so either a left diagonal direction or a right diagonal direction is determined as the direction of a final interpolation axis, and then the determination result is transmitted to the correlation data producing portion 28.

In the right/left direction determining portion 27, even if a direction having a stronger correlation is determined, in the case where the calculation result is out of a predetermined range such as the case where the calculation result is larger than a threshold value, it is judged that there is a possibility of an error in the detection of the correlation, thereby the determination of the direction of the final interpolation axis may be rejected. The judgment is also transmitted to the correlation data producing portion 28.

In addition to the determination result of the right/left direction determining portion 27, the upper data line 42, the lower data line 43 and the output results of the lower right diagonal direction detection portion 25 and the lower left diagonal direction detection portion 26 are inputted into the correlation data producing portion 28. The correlation data producing portion 28 determines a more specific direction from information of the direction having the strongest correlation and the like using the result of either the lower right diagonal direction detection portion 25 or the lower left diagonal direction detection portion 26 on the basis of the determination result of the right/left direction determining portion 27 which indicates a determined interpolation direction, and produces the interpolation data 44 of the pixel h which is the interpolation point using the inputted data to output the interpolation data 44. For example, in case the interpolation axis R1 in a right diagonal direction is determined as the direction of the interpolation axis on the basis of the determination result of the right/left direction determining portion 27, a value (average value) determined by dividing the sum of the pixel data of the pixels d and l on the interpolation axis R1 by two is considered as the interpolation data 44. Moreover, in case the determination of the direction of the interpolation axis is rejected by the right/left direction determining portion 27, for example, at least an average value of pixel data of not pixels in a diagonal direction but the pixels c and m directly above and directly below the pixel h is considered as the interpolation data 44.

As described above, in the embodiment, the direction of the interpolation axis is determined referring to not only two adjacent actual data lines W and X above and below the interpolation point but also pixels on the actual data line V above the actual data line W to produce the interpolation data 44, so compared to the case where diagonal interpolation is performed referring to only two actual data lines W and X, errors in interpolation can be prevented or reduced, thereby diagonal interpolation with less errors can be achieved. Therefore, high-quality intra-field interpolation can be achieved, thereby high-quality IP conversion can be achieved accordingly.

In the embodiment, the auxiliary interpolation point (pixel z) is set to perform diagonal interpolation referring to three lines. However, there is a method of performing diagonal interpolation referring to three lines without setting the auxiliary interpolation point.

Figure 9:
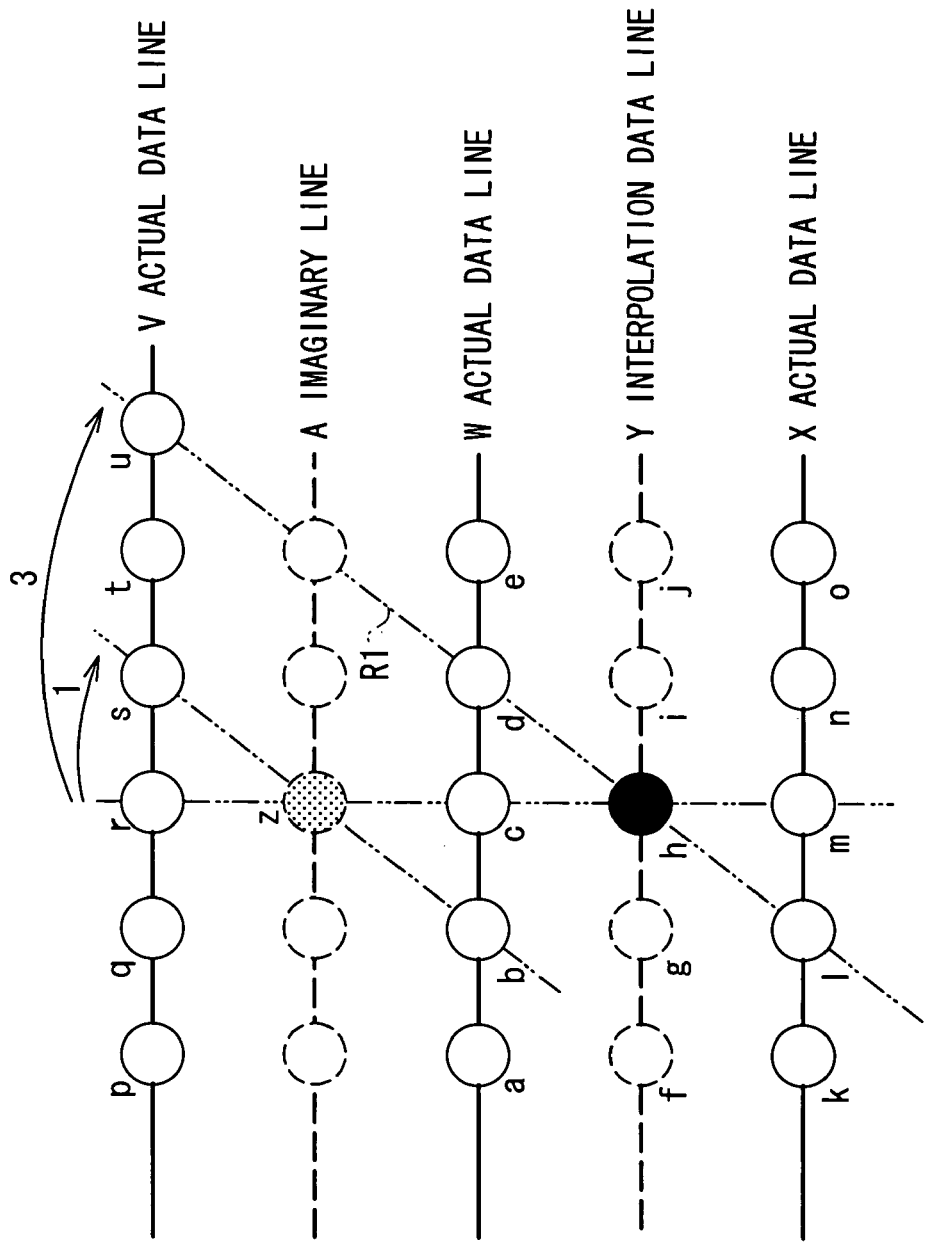
FIG. 9 is an illustration for describing comparison with another correlation detection method.

For example, as shown in FIG. 9, in order to detect correlation in a right diagonal direction, a method of extending the length of the interpolation axis R1 to the actual data line V positioned two lines away from the interpolation point, and referring to a pixel u on the actual data line V to detect correlation can be considered. In other words, correlation in a direction of the right diagonal interpolation axis R1 is detected referring to data of the pixel u in addition to pixels d and l. In the method, a method of detecting correlation is largely different from the technique of the embodiment, because the pixel z of the auxiliary interpolation point is not set, and functions and effects which can be obtained through the method are different from those in the embodiment.

For example, in the technique of the embodiment, when the correlation in a direction of the right diagonal interpolation axis R1 is determined, a referred pixel on the actual data line V positioned two lines above the pixel h is a point s positioned one pixel away from the pixel h of the interpolation point in a horizontal direction (herein, in order to simplify the description, the pixel is not grouped). On the other hand, in the technique of extending the interpolation axis, a referred pixel on the actual data line V positioned two lines above the pixel h is a point u positioned three pixels away from the pixel h of the interpolation point in a horizontal direction. It means that a pixel positioned three times farther away from the interpolation point is referred, compared to the technique of the embodiment. Therefore, in the technique of the embodiment, a pixel data range referred for interpolation detection is narrower in terms of time, so a smaller amount of memory required for processing (for recording data of the referred pixel) is required.

The invention is not limited to the above embodiment, and can be variously modified. For example, in the above embodiment, the case where a pixel on the actual data line X directly below the interpolation point and pixels on two actual data lines W and V above the interpolation point are used to detect correlation is described; however, correlation may be detected by using a pixel on a line positioned two lines below the interpolation point (that is, a line directly below the actual data line X) instead of the actual data line V above the interpolation point. In this case, an auxiliary interpolation point is set directly below the interpolation point on an imaginary line set between two actual data lines below. Moreover, the number of pixel lines (actual data lines) used to detect correlation is not limited to three, and the number of the lines can be increased to four. In other words, two actual data lines each above and below the interpolation point may be used. A trade-off for an increase in the number of lines is cost; however, when four lines are used, higher accuracy in correlation detection can be expected.

Moreover, in the embodiment, 5 directions (L2, L1, C1, R1 and R2) including a central direction are set as directions of interpolation detection (directions of interpolation axes); however, more than 5 directions of detection can be set. Further, in the above embodiment, as shown in Formula 3, when the calculation of DiffGroup is performed, the values of three pixels are set as a group, but detection accuracy can be improved by using more pixels. Moreover, the number of groups can be increased.

Further, in the above embodiment, as the pixel used as the auxiliary interpolation point is the pixel z directly above (or directly below) the interpolation point, but the pixel used as the auxiliary interpolation point may be any pixel positioned a few pixels away from the pixel z in proximity to the pixel z directly above (or directly below) the interpolation point.

Figure 10:
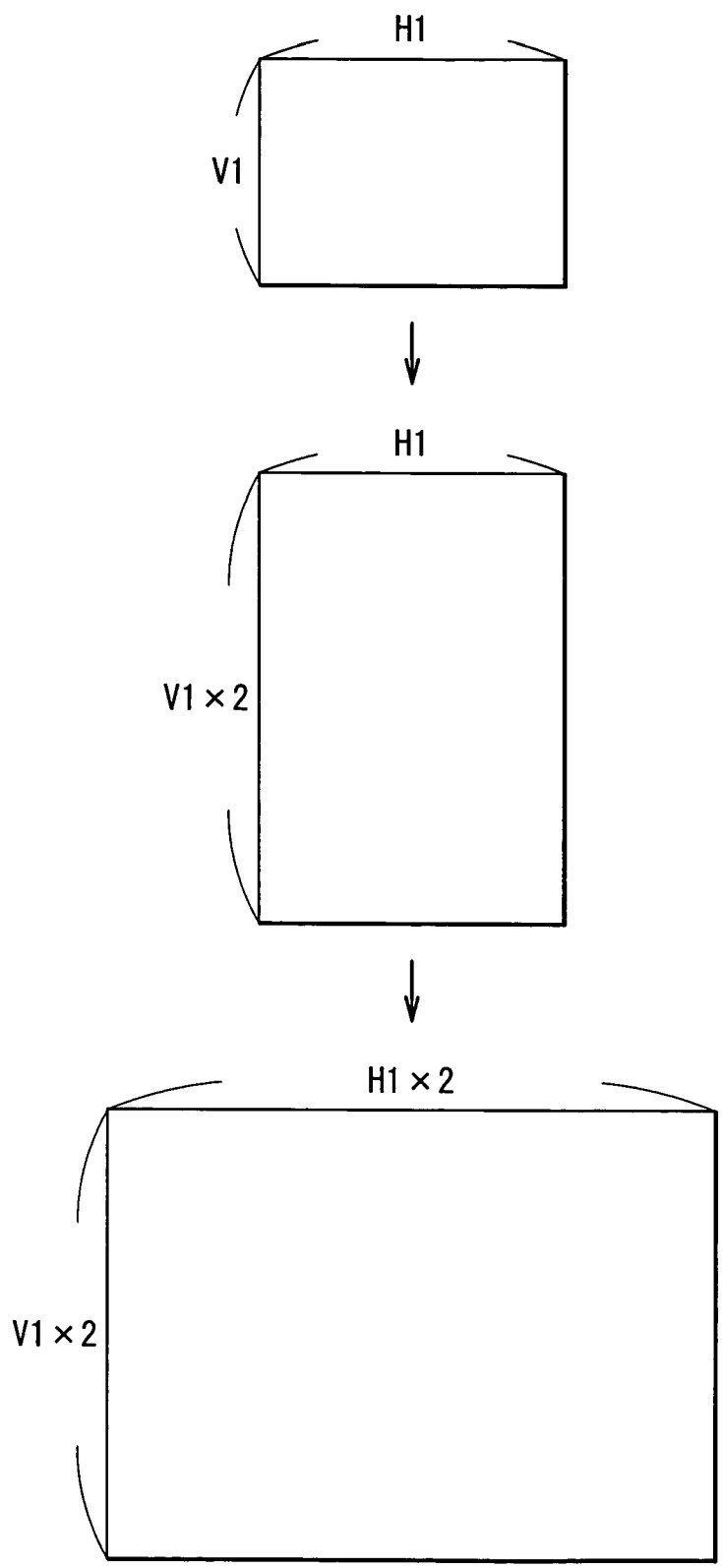
FIG. 10 is an illustration for describing resolution conversion.
Figure 11:
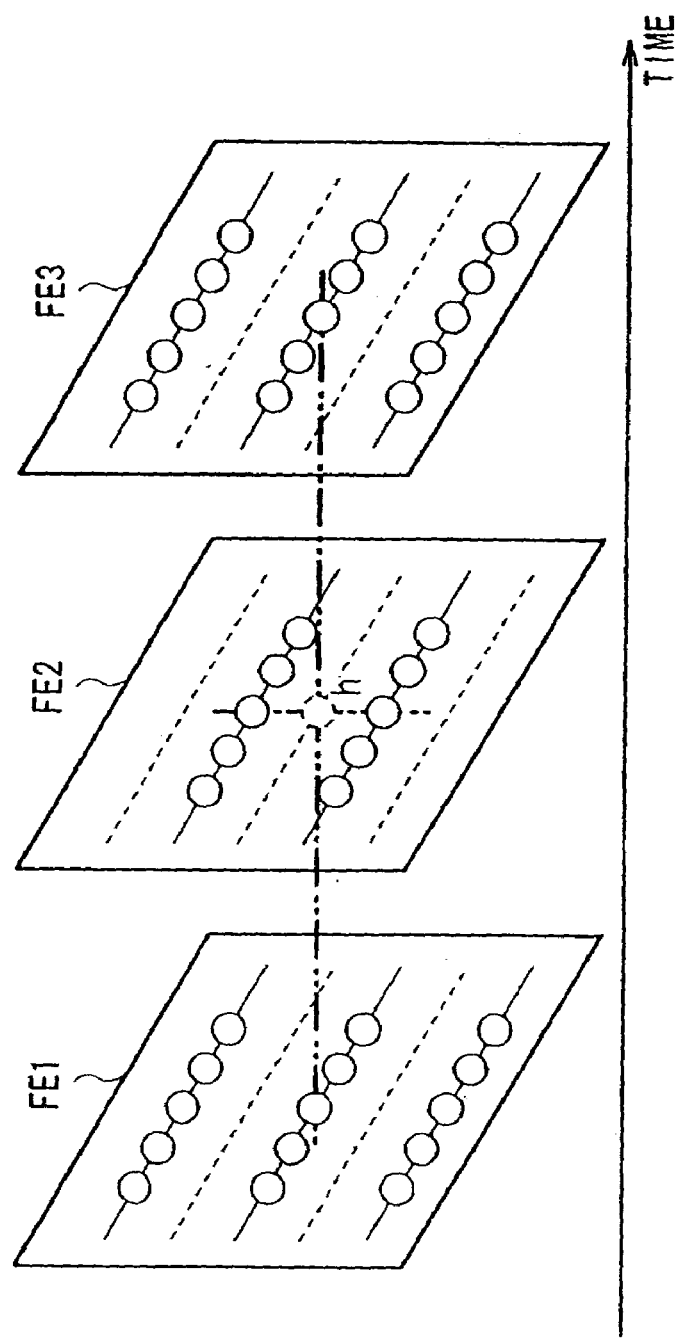
FIG. 11 is an illustration for describing the concept of IP conversion.
Figure 12:
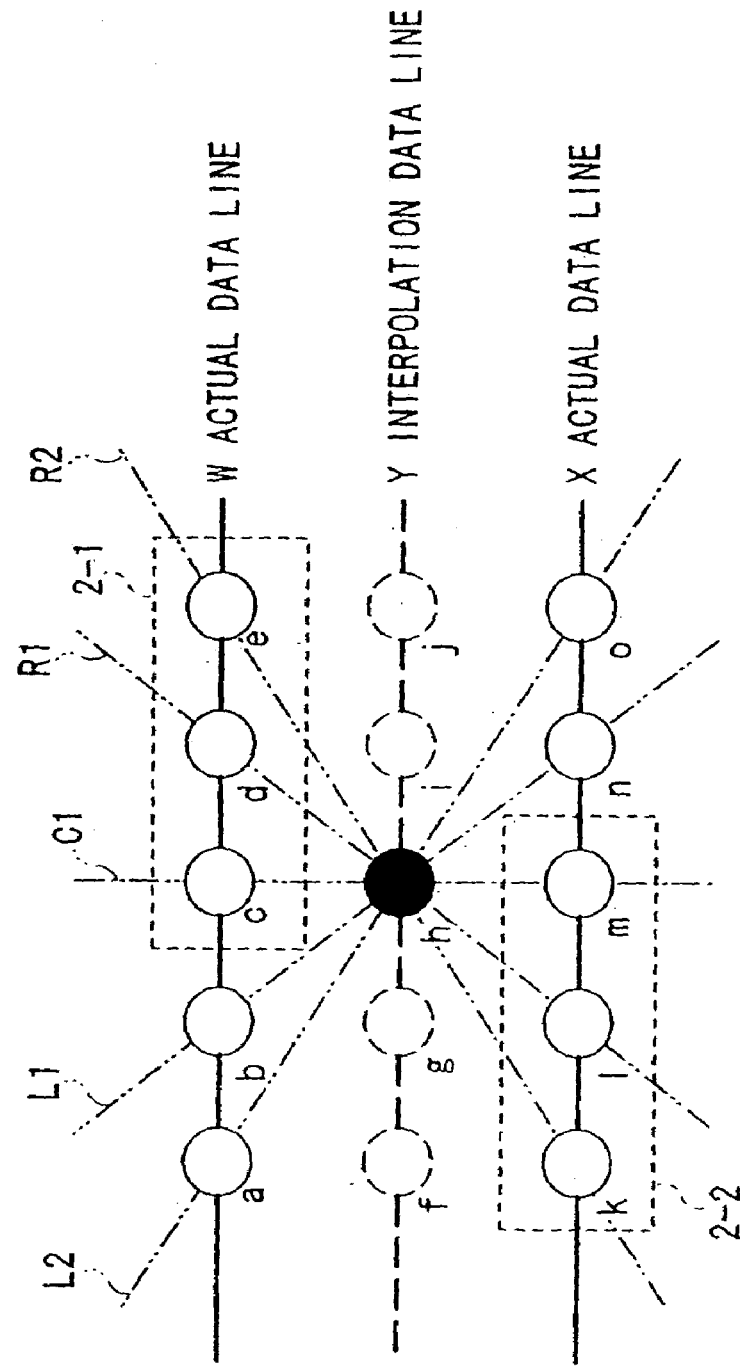
FIG. 12 is an illustration for describing the concept of conventional intra-field interpolation.
Figure 13:
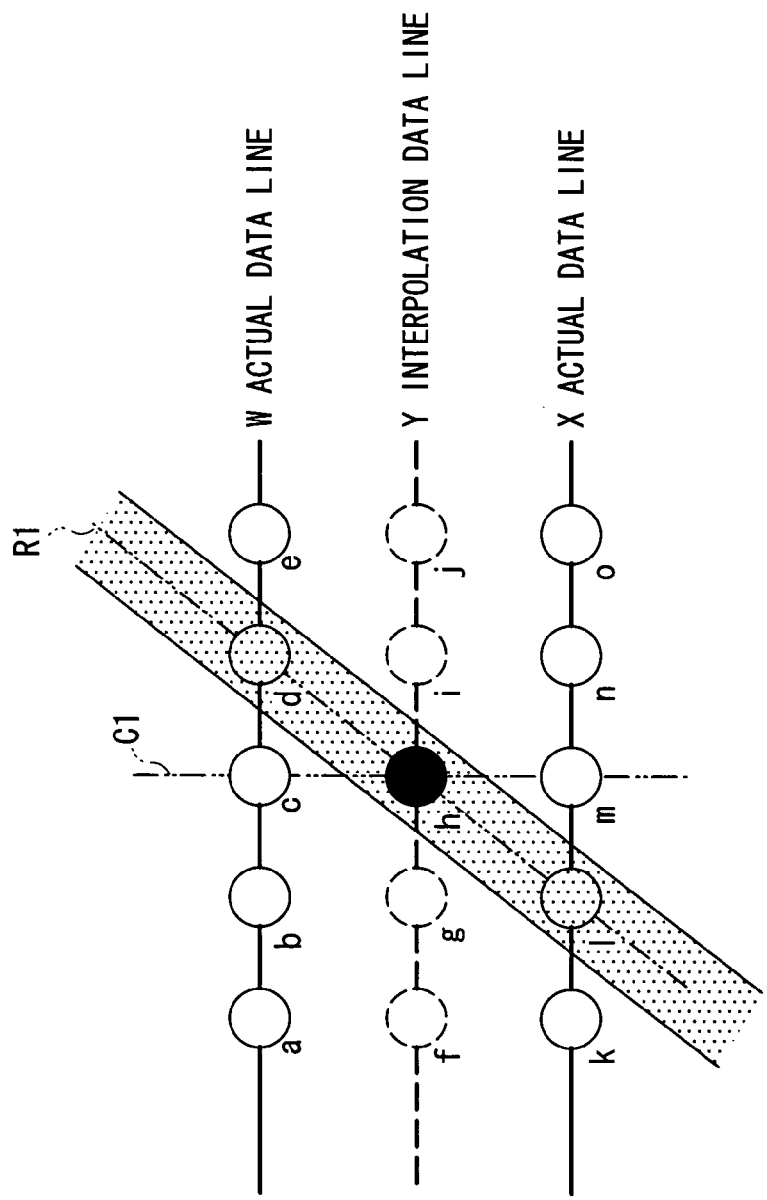
FIG. 13 is an illustration for describing a problem arising when diagonal interpolation is used.

Moreover, the technique of the intra-field interpolation according to the embodiment can be applied to not only IP conversion but also, for example resolution conversion. For example, as shown in FIG. 10, by the technique of intra-field interpolation according to the embodiment, an image with a horizontal pixel number H1 by a vertical pixel number Vi is converted through doubling the vertical pixel number Vi and then the horizontal pixel number H1. Thereby, conversion for doubling the resolution in horizontal and vertical directions can be achieved with high quality. As can be seen from this, the technique of intra-field interpolation according to the embodiment can be applied to not only the case of increasing the number of pixels (the number of scanning lines) in a vertical direction but also the case of increasing the number of pixels in a horizontal direction. In the case where the number of pixels in a horizontal direction is increased, a series of pixels continued in a vertical direction are treated as one pixel line.

As described above, in the image processing apparatus according to the embodiment, the image processing method, the video display apparatus and the recorded information reproducing apparatus on the basis of the embodiment, an interpolation direction is determined referring to pixels on at least three pixel lines including pixels on the first pixel line and the second pixel line vertically or horizontally adjacent to the pixel to be interpolated and a pixel on the third or the fourth pixel line to produce data of the pixel to be interpolated, so compared to the case where diagonal interpolation is performed referring to only two pixel lines, errors in interpolation can be prevented or reduced, thereby diagonal interpolation with less errors can be achieved. Therefore, high-quality intra-field interpolation can be achieved, thereby high-quality IP conversion can be achieved accordingly.

More specifically, a pixel in a position closest to the pixel to be interpolated or a pixel in proximity to a pixel in a position closest to the pixel to be interpolated on the imaginary line is set as an auxiliary pixel, so a pixel data range referred for determining correlation can be reduced.

The invention claimed is:

1. An image processing apparatus, interpolating pixel data for a part where no data exists in a field of input signals from other pixel data existing in the field, the image processing apparatus comprising:

a first correlation detection portion detecting correlation of pixels on a first pixel line and a second pixel line vertically or horizontally adjacent to a pixel to be interpolated in a plurality of directions around the pixel to be interpolated;

a second correlation detection portion detecting at least one of correlation between a pixel on the first pixel line and a pixel on a third pixel line positioned two lines away from the pixel to be interpolated in a direction of the first pixel line or correlation between a pixel on the second pixel line and a pixel on a fourth pixel line positioned two lines away from the pixel to be interpolated in a direction of the second pixel line in a plurality of directions around an auxiliary pixel set in a position different from the pixel to be interpolated;

a determining means determining an interpolation direction on the basis of detection results of the first correlation detection portion and the second correlation detection portion; and a producing means producing interpolation data of the pixel to be interpolated referring to data of pixels on the first pixel line and the second pixel line existing in the determined interpolation direction, wherein in the second correlation detection portion, if correlation between a pixel on the first pixel line and a pixel on the third pixel line is determined, a pixel on an imaginary line set between the first pixel line and the third pixel line is set as the auxiliary pixel, and if correlation between a pixel on the second pixel line and a pixel on the fourth pixel line is determined, a pixel on an imaginary line set between the second pixel line and the fourth pixel line is set as the auxiliary pixel.

2. An image processing apparatus according to claim 1, wherein a pixel in a position closest to the pixel to be interpolated or a pixel in proximity to a pixel in a position closest to a pixel to be interpolated is set as the auxiliary pixel.

3. An image processing apparatus according to claim 1, wherein the first correlation detection portion detects correlation of pixels in a vertical direction, pixels in a left diagonal direction and pixels in a right diagonal direction with respect to the pixel to be interpolated, and the second correlation detection portion detects correlation of pixels in a vertical direction, pixels in a left diagonal direction and pixels in a right diagonal direction with respect to the auxiliary pixel.

4. An image processing apparatus according to claim 3, wherein the determining means determines the interpolation direction on the basis of comparison between a first arithmetic result by at least a correlation value of the pixels in the left diagonal direction outputted from the first correlation detection portion and the second correlation detection portion and a second arithmetic result by at least a correlation value of the pixels in the right diagonal direction outputted from the first correlation detection portion and the second correlation detection portion.

5. An image processing apparatus according to claim 4, wherein the first arithmetic result is a result of adding a correlation value of the first correlation detection portion showing the strongest correlation among a plurality of directions including at least the left diagonal direction and a correlation value of the second correlation detection portion showing the strongest correlation among a plurality of directions including at least the left diagonal direction, and the second arithmetic result is a result of adding a correlation value of the first correlation detection portion showing the strongest correlation among a plurality of directions including at least the right diagonal direction and a correlation value of the second correlation detection portion showing the strongest correlation among a plurality of directions including at least the right diagonal direction.

6. An image processing apparatus according to claim 5, wherein the producing means produces interpolation data in an interpolation direction corresponding to the correlation value of the first correlation detection portion showing the strongest correlation among a plurality of directions including the left diagonal direction or the correlation value of the first correlation detection portion showing the strongest correlation among a plurality of directions including the right diagonal direction on the basis of the interpolation direction determined by the determining means.

7. An image processing apparatus according to claim 4, wherein if the first arithmetic result or the second arithmetic result is not a value within a predetermined range, interpolation is performed using at least two pixels vertically adjacent to the pixel to be interpolated.

8. An image processing apparatus according to claim 1, wherein intra-field interpolation for converting interlaced input signals into progressive signals is performed.

9. An image processing method, interplating pixel data for a part where no data exist in a field of input signals from other pixel data existing in the field, the method comprising:

a first detection step of detecting correlation of pixels on a first pixel line and a second pixel line vertically or horizontally adjacent to a pixel to be interpolated in a plurality of directions around the pixel to be interpolated;

a second detection step of detecting at least one of correlation between a pixel on the first pixel line and a pixel on a third pixel line positioned two lines away from the pixel to be interpolated in a direction of the first pixel line or correlation between a pixel on the second pixel line and a pixel on a fourth pixel line positioned two lines away from the pixel to be interpolated in a direction of the second pixel line in a plurality of directions around an auxiliary pixel set in a position different from the pixel to be interpolated;

a step of determining an interpolation direction on the basis of detection results of the first detection step and the second detection step; and a step of producing interpolation data of the pixel to be interpolated referring to data of pixels on the first pixel line and the second pixel line existing in the determined interpolation direction, wherein in the second detection step, if correlation between a pixel on the first pixel line and a pixel on the third pixel line is determined, a pixel on an imaginary line set between the first pixel line and the third pixel line is set as the auxiliary pixel, and if correlation between a pixel on the second pixel line and a pixel on the fourth pixel line is determined, a pixel on an imaginary line set between the second pixel line and the fourth pixel line is set as the auxiliary pixel.

10. A video display apparatus, comprising:

an image processing portion performing intra-field interpolation on input video signals; and a display portion displaying pictures on the basis of the video signals processed by the image processing portion, the image processing portion comprising:

a first correlation detection portion detecting correlation of pixels on a first pixel line and a second pixel line vertically or horizontally adjacent to a pixel to be interpolated in a plurality of directions around the pixel to be interpolated;

a second correlation detection portion detecting at least one of correlation between a pixel on the first pixel line and a pixel on a third pixel line positioned two lines away from the pixel to be interpolated in a direction of the first pixel line or correlation between a pixel on the second pixel line and a pixel on a fourth pixel line positioned two lines away from the pixel to be interpolated in a direction of the second pixel line in a plurality of directions around an auxiliary pixel set in a position different from the pixel to be interpolated;

a determining means determining an interpolation direction on the basis of detection results of the first correlation detection portion and the second correlation detection portion; and a producing means producing interpolation data of the pixel to be interpolated referring to data of pixels on the first pixel line and the second pixel line existing in the determined interpolation direction, wherein in the second correlation detection portion, if correlation between a pixel on the first pixel line and a pixel on the third pixel line is determined, a pixel on an imaginary line set between the first pixel line and the third pixel line is set as the auxiliary pixel, and if correlation between a pixel on the second pixel line and a pixel on the fourth pixel line is determined, a pixel on an imaginary line set between the second pixel line and the fourth pixel line is set as the auxiliary pixel.

11. A recorded information reproducing apparatus, reproducing signals obtained through performing intra-field interpolation on video information recorded on a recording medium to output the signals, as means for performing the intra-field interpolation, the recorded information reproducing apparatus comprising:

a first correlation detection portion detecting correlation of pixels on a first pixel line and a second pixel line vertically or horizontally adjacent to a pixel to be interpolated in a plurality of directions around the pixel to be interpolated;

a second correlation detection portion detecting at least one of correlation between a pixel on the first pixel line and a pixel on a third pixel line positioned two lines away from the pixel to be interpolated in a direction of the first pixel line or correlation between a pixel on the second pixel line and a pixel on a fourth pixel line positioned two lines away from the pixel to be interpolated in a direction of the second pixel line in a plurality of directions around an auxiliary pixel set in a position different from the pixel to be interpolated;

a determining means determining an interpolation direction on the basis of detection results of the first correlation detection portion and the second correlation detection portion; and a producing means producing interpolation data of the pixel to be interpolated referring to data of pixels on the first pixel line and the second pixel line existing in the determined interpolation direction, wherein in the second correlation detection portion, if correlation between a pixel on the first pixel line and a pixel on the third pixel line is determined, a pixel on an imaginary line set between the first pixel line and the third pixel line is set as the auxiliary pixel, and if correlation between a pixel on the second pixel line and a pixel on the fourth pixel line is determined, a pixel on an imaginary line set between the second pixel line and the fourth pixel line is set as the auxiliary pixel.

* * * * *